United States Patent
Kersten et al.

(10) Patent No.: US 6,990,275 B2
(45) Date of Patent: Jan. 24, 2006

(54) STRAY LIGHT ABSORBER INCLUDING GRATING ARRAY

(75) Inventors: Peter Kersten, Weissach (DE); Gerhard Schreiber, Korntal (DE); Roland Münzner, Bissingen/Teck (DE)

(73) Assignee: Avanex Corporation, Fremont, CA (US)

( * ) Notice: Subject to any disclaimer, the term of this patent is extended or adjusted under 35 U.S.C. 154(b) by 29 days.

(21) Appl. No.: 10/778,897

(22) Filed: Feb. 12, 2004

(65) Prior Publication Data
US 2004/0223695 A1 Nov. 11, 2004

(30) Foreign Application Priority Data
Feb. 14, 2003 (EP) ............................................. 03290370

(51) Int. Cl.
*G02B 6/34* (2006.01)

(52) U.S. Cl. .............................. 385/37; 385/31; 385/47; 385/49; 385/129; 385/130; 385/131

(58) Field of Classification Search .................... 385/31, 385/37, 129, 130, 131, 901
See application file for complete search history.

(56) References Cited

U.S. PATENT DOCUMENTS 5,410,421 A * 4/1995 Huignard et al. ............. 359/15
5,886,971 A    3/1999 Feldman et al. ............. 369/112
5,915,051 A * 6/1999 Damask et al. ............... 385/16
6,496,622 B1 * 12/2002 Hoose et al. ................. 385/37
2002/0037135 A1 * 3/2002 Atieh et al. .................... 385/37
2004/0223695 A1 * 11/2004 Kersten et al. ................ 385/37

FOREIGN PATENT DOCUMENTS

| EP | 0 883 000 | 12/1998 | ............... 385/37 X |
| EP | 1 182 475 | 2/2002 | ............... 385/37 X |
| FR | 2 800 475 | 5/2001 | ............... 385/37 X |
| JP | 62123411 | 6/1987 | ............... 385/37 X |
| JP | 63269129 | 11/1988 | ............... 385/37 X |
| JP | 01054425 | 3/1989 | ............... 385/37 X |
| WO | WO 00/29883 | 5/2000 | ............... 385/37 X |

OTHER PUBLICATIONS

EP Search Report, Application No. EP 03 29 0370, dated Jul. 10, 2003.

* cited by examiner

*Primary Examiner*—Brian M. Healy
(74) *Attorney, Agent, or Firm*—Moss, Patterson & Sheridan, LLP

(57) ABSTRACT

An optical component comprising an optical waveguide and adjacent to it at least one grating array adapted to reflect stray light away from said optical waveguide. The use of a grating array with a plurality of structures like polygons or stripes gives the possibility to define a multiple of reflection directions. This is obtained by using polygons layed out in different orientations up to a random one or a Bragg grating preferably defined with a non-uniform period (chirped). Such grating arrays are usually structured within the same layer as the optical waveguide core layer.

19 Claims, 5 Drawing Sheets

STRAY LIGHT ABSORBER INCLUDING GRATING ARRAY

CROSS-REFERENCE

This application claims the benefit of foreign priority under 35 USC § 119 and 365 to European Application No. 03290370.0 filed on 14 Feb. 2003.

BACKGROUND OF THE INVENTION

The present invention relates to an optical component comprising an optical waveguide structured in a core layer and to a photonic device comprising at least one such optical component.

Optical components comprising an optical waveguide are part of planar photonic devices. Such optical components can be designed to function, among other things, as multiplexers, switches or filters. The optical waveguides within such an optical component are used for carrying light e.g. from one part to another one of the planar photonic devices. In the past, the number of optical components formed within a photonic device has been increased continuously. Such an increase of optical components integrated in a single photonic device implies a higher compactness and/or the ever increase of optical signals to be transmitted through the same optical waveguide leading to stringent working conditions. This is particularly the case concerning the tolerable stray light possibly present at some parts of the photonic device. Indeed, such stray light can be the origin of cross-talk and optical noise. Hence, the-presence of stray light may directly deteriorate the overall performance of the device. Therefore, there is a real need to alleviate or eliminate stray light.

WO 01/33263 A1 discloses a method of filtering optical noise generated by an optical component in a planar photonic device. The planar photonic device in which this method is implemented comprises refractive index change regions. These regions are placed symmetrically on either side of the path of the light downstream from the optical component and are adapted to prevent forward propagation of the light outside said path. The refractive index change regions can be constituted by trenches or by regions possessing saw tooth-shaped elements etched in the photonic devices. This prior art document explicitly teaches to use refractive index change regions in a symmetrical configuration, that is on both sides of for example an optical waveguide carrying the light. The design of the planar photonic device is strongly restricted due to the necessity of a symmetrical configuration of the refractive index change regions. Beside that, the necessity of a supplementary etching process is inevitably associated with a higher manufacturing cost factor of such photonic device.

In U.S. Pat. No. 6,298,178 B1 is described an alternative by doping selected areas of the substrate on which an integrated optical circuit is formed. Those selected areas show accordingly the property of absorbing light. When designed in an appropriate way in the vicinity of the integrated optical circuit, these selected areas will absorb stray light present in the substrate which is not guided by components of the optical circuit. Despite a different approach compared to WO 01/33263 A1, it has clearly the same disadvantage as quoted above.

U.S. Pat. No. 6,212,307 B1 [EP806685] discloses an integrated optical device which has an optical microguide of index $n_0$ between two confinement layers of index respectively $n_1$ and $n_1'$. The index $n_0$ of the microguide exceeds both indices $n_1$ and $n_1'$ such that any radiation introduced into said microguide propagates along the axis of the latter. Filtering means constituted by at least one reflector element are placed on at least one side of the microguide, the reflector element having at least one element etched in layers of index $n_1$ and/or $n_1'$ and/or $n_0$. In this approach, the problem of stray light is overcome by reflector elements which reflect the stray light away from the microguide. Besides showing similar disadvantage as the two previous examples, the reflecting elements must be designed in a relatively large scale to obtain a satisfying effectiveness. This restricts substantially its application.

SUMMARY OF THE INVENTION

In view of the above, it is an object of the present invention to provide an optical component allowing one to suppress stray light with high effectiveness while being applicable to different configurations without implying a notable cost factor in the manufacture of photonic devices.

This object is achieved in accordance with the invention by an optical component comprising an optical waveguide and adjacent to it at least a grating array adapted to reflect stray light away from said optical waveguide. The use of a grating array leads to high flexibility concerning, among other things, the reflection direction to be chosen and/or the possibility to select a specific wavelength window. Advantageously, the use of a grating array with a plurality of structures like polygons or stripes gives the possibility to define a multiple reflection direction. This is possibly obtained using polygons laid out in different orientations up to a random one.

Alternately to the polygon, the grating array may be designed as a grating array of several adjacent stripes. Advantageously, the grating array may be chosen such that the stripes are equidistantly placed, while possibly using at least two different characteristic spacings for this distance. In such a way, it is possible to optimize the grating array for stray light of specific wavelength. It may be of benefit to design a grating array with bent strips improving even more the reflection property. The latter design gives also the possibility to collect the stray light into some particular region where a light absorbing material could be present.

A further advantage of the present invention is obtained by structuring said grating array in the same core layer as the one of the optical waveguide. In such a way, the choice of a grating array for reflecting stray light will not require a new step during the processing of the optical component.

In an embodiment, the array are chosen to be Bragg gratings. Such array can be advantageously designed as a chirped one with a non-uniform period. The period can be adapted to correspond to the operating window for optical signals to be transmitted through said optical waveguide. Therefore, the array are optimized to reflect any stray light particularly disturbing in the operating of a photonic device. Furthermore, the Bragg gratings can be designed slanted with an angle defined in the plane comprising said optical waveguide. Alternately, the angle can be defined in a plane perpendicular to it. The choice of the orientation of the slanted Bragg grating is advantageously taken according to the most appropriate region where the stray light shall be reflected.

Advantageous developments of the invention are described in the dependent claims, the following description and the drawings.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

In FIGS. 1a-d are shown four different grating arrays according to the invention. The gratings are formed by straight or bent stripes, polygons like rectangles or squares respectively. All these grating arrays are preferably but not exclusively structured in the same core layer as the one used for structuring the waveguide from which stray light must be reflected away using the grating arrays. The grating arrays of FIGS. 1a and b are designed to form preferably but not exclusively a Bragg grating. In such a way, the stray light to act on it will be reflected using some constructive interference directed away from the optical waveguide for enhanced efficiency. The grating arrays of FIGS. 1c and d are two different examples of a grating array built using a multitude of polygons. When not designed as Bragg gratings, then the polygons will not be all orientated in the same way. The reflection of the stray light will not be based by some constructive interference but will be due to simple reflection possibly in different directions. The distance between the different polygons and their orientations may be chosen according to the desired effect. For example, the squares of the grating array from FIG. 1d can be designed with a distance between each other of approximately half of the main wavelength of the stray light to be reflected.

Figure 2:
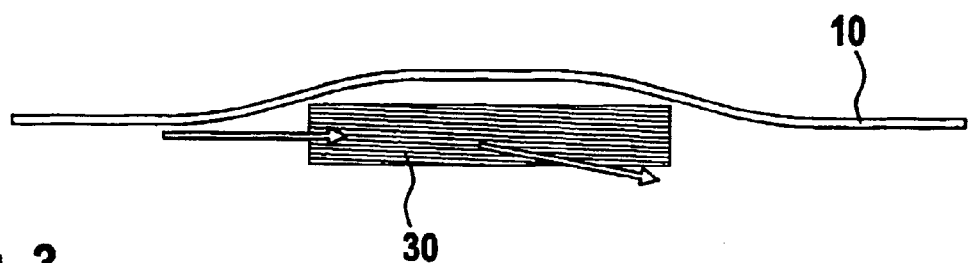
FIG. 2 is a schematic top view of an optical component according to a first embodiment.

In FIG. 2 is shown a top view of an optical component comprising an optical waveguide 10 structured in a core layer with at one side a grating array. In the present embodiment, the grating array is chosen to be a Bragg grating e.g. designed using close-by stripes. Such grating array is placed at a judicious region of the optical component e.g. adjacent to a bent section of the optical waveguide. This offers a good possibility to "extract" stray light coming from a defect or from some optical noise out of the optical signal to be transmitted through said optical waveguide. For this purpose, the Bragg grating may be formed by parallel stripes inclined to the propagation direction reflecting stray light radiated from the bent section of the optical waveguide. Re-entering of the radiated light into a second bent section of the optical waveguide can be prevented. Such optical component can be used for photonic devices like an AWG (Arrayed Waveguide Grating), an optical switch, or an optical delay line.

Figure 3:
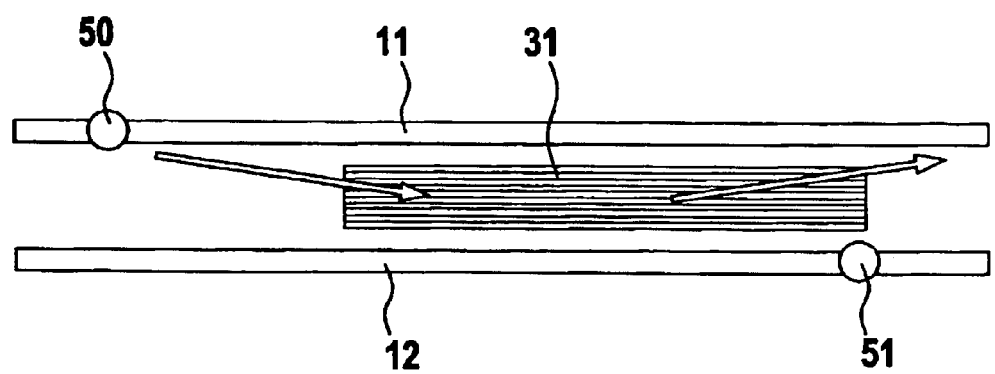
FIG. 3 is a schematic top view of an optical component according to a second embodiment.

In FIG. 3 is shown a top view of an optical component comprising two close-by optical waveguides 11, 12 with in between a grating array 31 according to the invention. Here, again a Bragg grating formed by stripes parallel to the propagation direction can be chosen. In such a way, the grating array 31 prevents coupling between the waveguide through scattered light radiated by distortions 50, 51. Such distortions may be defects like point defects or distributed defects e.g. a wall roughness of the waveguide core, functional elements as MEMS-shutters, splitters or any deviation from an ideally smooth and straight optical waveguide.

Figure 4:
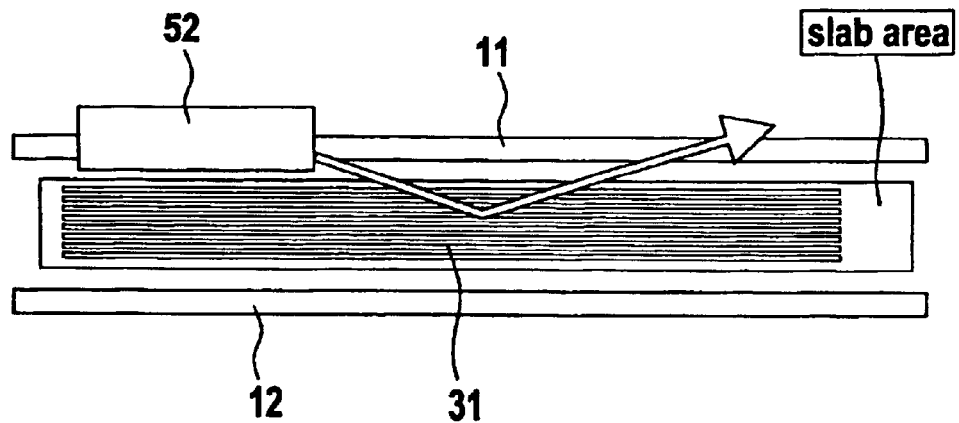
FIG. 4 is a schematic top view of an optical component according to a third embodiment.

In FIG. 4 is shown a top view of an optical component similar to the one of FIG. 3 with a detailed example of a possible source for stray light. Here, it is the presence of a metal film 52 on top of the first optical waveguide 11 which will be the source of stray light. The stray light will be reflected by the Bragg grating 31 under a small angle. Due to the small angle, the efficiency of such reflection can be high despite of the use of few stripes fitting between the two optical waveguides 11 and 12. Latter may be at a distance as small as 100 μm. The whole i.e. the two optical waveguides 11, 12 and the grating array 31 may be structured in a single step in a core layer using classical UV-techniques.

Figure 1A:
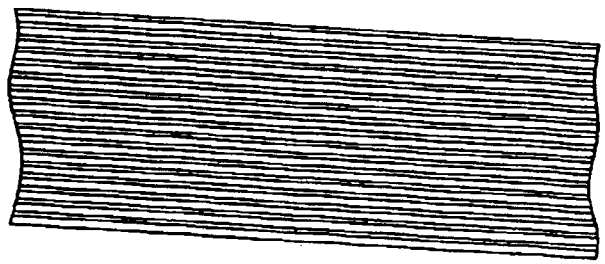
FIG. 1 a to d show four different grating arrays according to the invention.
Figure 1B:
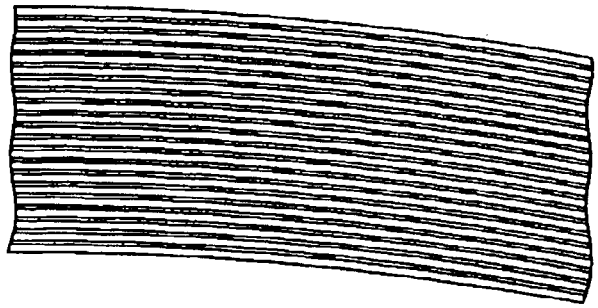
Figure 1C:
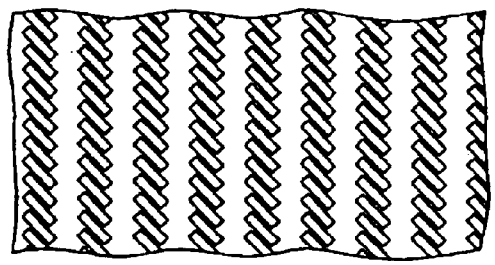
Figure 1D:
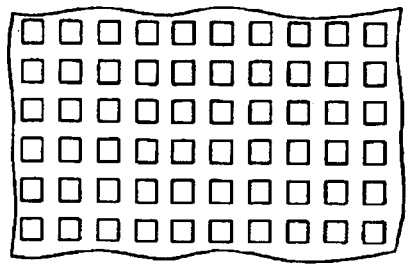

In the embodiments of FIG. 2 to 4, the Bragg grating may be embodied by a grating array of the kind shown in FIG. 1c or 1d depending on the stray light expected and the device geometry.

Figure 5:
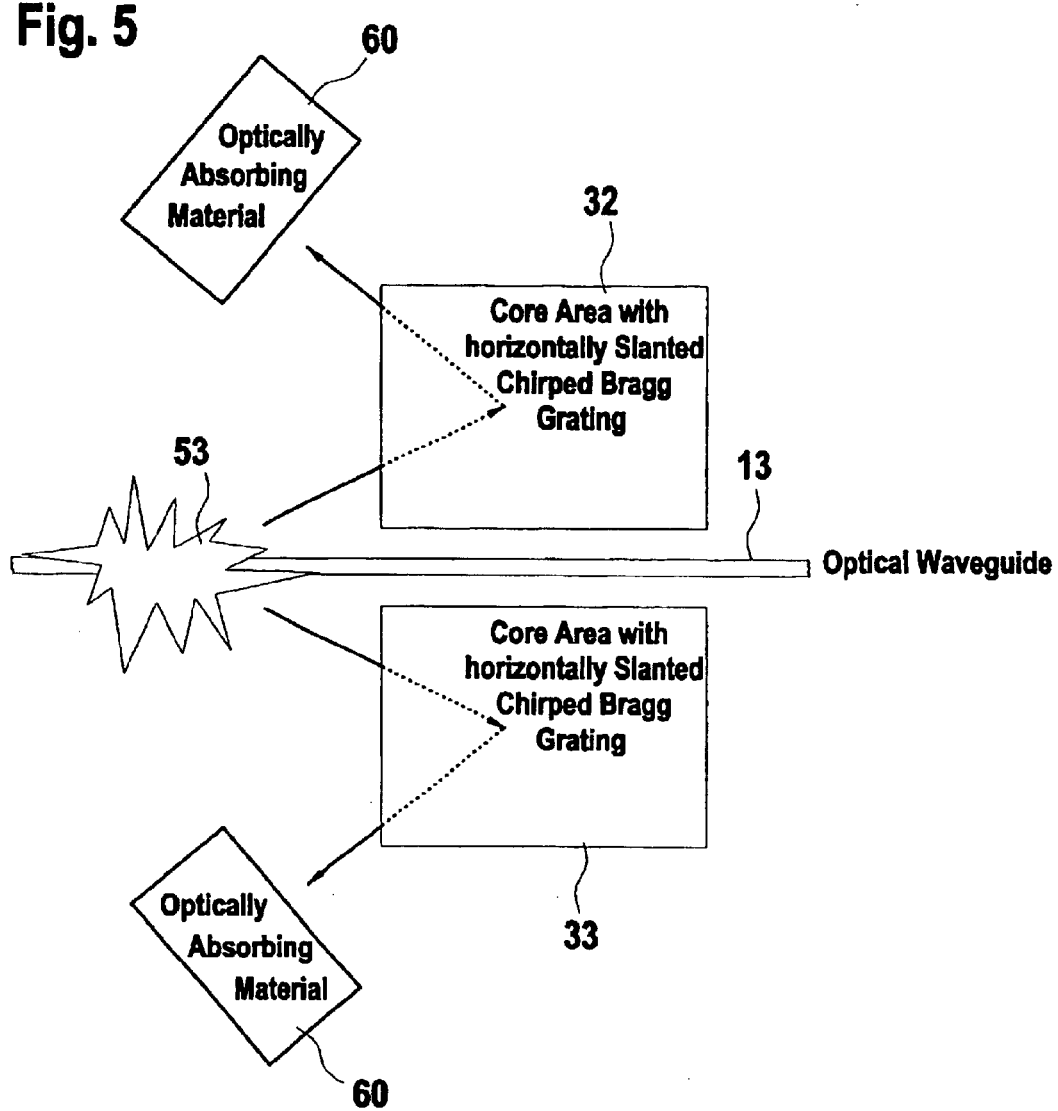
FIG. 5 is a schematic top view of an optical component according to a fourth embodiment.

In FIG. 5 is shown a top view of an optical component comprising an optical waveguide 13 with a source of stray light 53. Adjacent and on both sides to said optical waveguide are designed two grating arrays 32, 33 to reflect the stray light 53 away from that optical waveguide 13. The present grating arrays 32 and 33 are chosen to be Bragg gratings horizontally slanted i.e. with an angle defined in the plane comprising said optical waveguide. In such a way, the reflection direction will be in the same plane as the optical waveguide. As for previous examples, the grating arrays 32 and 33 can be advantageously structured in the core layer together with the optical waveguide 13.

Figure 6:
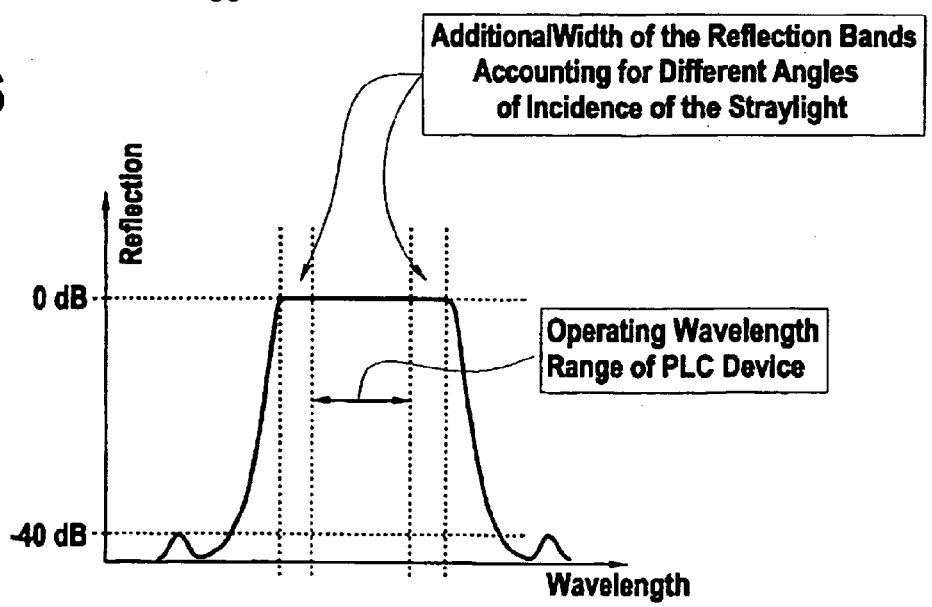
FIG. 6 is a reflection spectrum of a grating array according to the invention.

It is of interest to choose a grating array adapted to reflect stray light of wavelength comprised in a predefined window. In FIG. 6 is shown a schematic band reflection spectrum of a chirped and apodised UV-written grating array. The arrays can be chosen as Bragg gratings e.g. in an arrangement as shown in FIG. 5. The respective Bragg gratings are designed with a non-uniform period (chirped) matching the predefined wavelength window. It is possible but not required for the realization of the invention to design the Bragg gratings with a tailored spectral response (apodization).

Figure 7A:
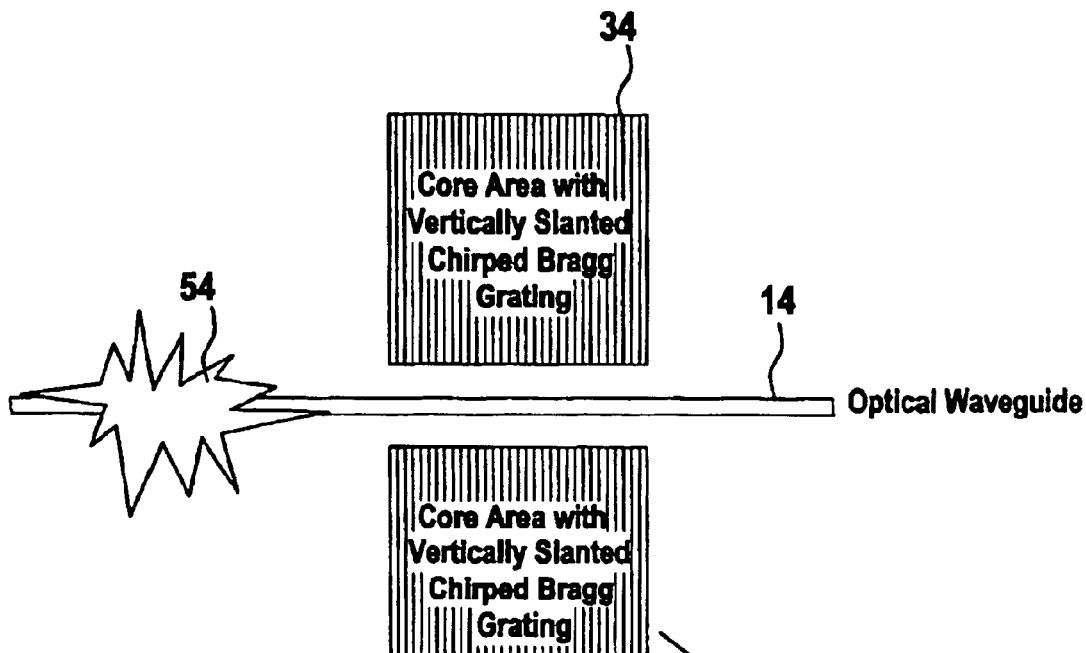
FIGS. 7a, 7b are respectively a schematic top and sectional view of an optical component according to a fifth embodiment.
Figure 7B:
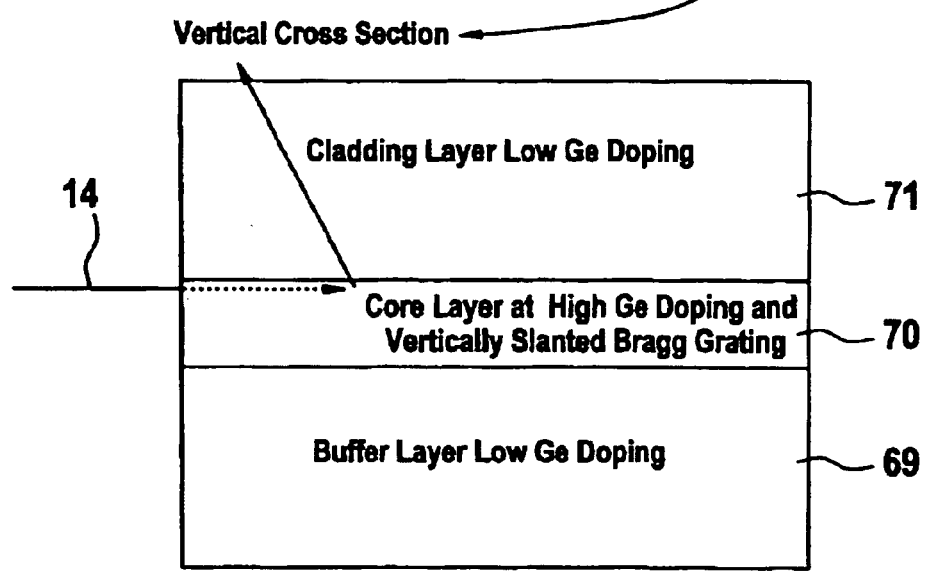

In FIG. 7a is shown an optical component according to the present invention comprising two grating arrays 34, 35 structured in the plane comprising the optical waveguide 14. The grating arrays 34, 35 chosen to be Bragg gratings are placed similar to the embodiment of FIG. 5 i.e. at each side adjacent to an optical waveguide 14. The gratings are designed to be almost vertically slanted i.e. slanted with an angle defined in a plane perpendicular to the plane comprising said optical waveguide and possibly chirped. This can be obtained e.g. using a holographic method for writing the grating. The slant angle and the chirp of the Bragg gratings are adjusted according to the FIG. 6 in such a way that the reflection (stop) band of the gratings covers the whole operating wavelength range of a photonic device on which said optical component will be implement. In FIG. 7b is shown a sectional view of said optical component according to FIG. 7a. The core layer 70 in which the optical waveguide 14 as well as the grating arrays 34 and 35 are structured is sandwiched between a buffer layer 69 and a cladding layer 71. As an example, the buffer layer 69 can be doped with group IV atoms like Ge enhancing the photosensitivity of the layer, the doping rate being chosen to be low compared to the doping rate used for the core layer 70. The cladding layer 71 can also be doped using atoms at similar doping rate as the buffer layer 69. The parameters of the grating arrays can be chosen to reflect at all relevant angles of incidences stray light produced e.g. at some defect 54 on the optical waveguide. In such a way, the stray light will be scattered out of the photonic device through the cladding layer 71.

Figure 8:
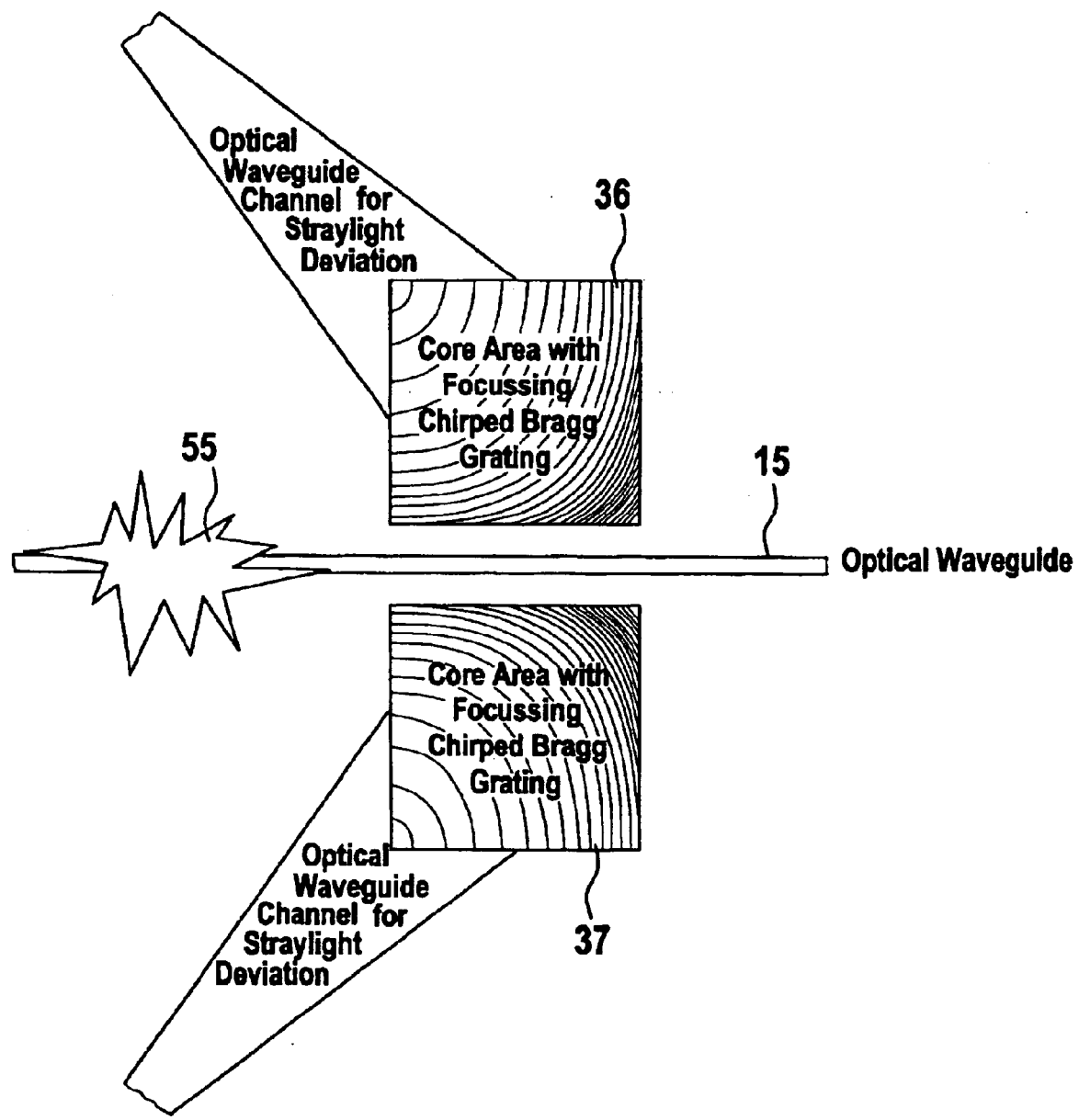
FIG. 8 is a schematic top view of an optical component according to a sixth embodiment.

In FIG. 8 is shown a schematic top view of an optical component comprising an optical waveguide 15 with its source of stray light 55. Adjacent to said optical waveguide 15 and on each side is structured an array grating 36, 37 to reflect away from said optical waveguide 15 any possible stray light. As distinct from the previous embodiment, the grating arrays 36 and 37 can be designed with a non-uniform bent structure so to give a chirped Bragg grating with a focusing core area. The focusing characteristics and the chirp of the Bragg gratings are adjusted according to FIG. 6 in such a way that the reflection (stop) band of the grating covers the whole operating wavelength range of the photonic device comprising such optical component.

The use of an optical component according to FIG. 8 allows one to reflect away the stray light to some specific relevant region like a channel on said optical component. Even though it may represent at first stage some additional difficulties to fabricate such optical component with those grating arrays, they are especially useful if stray light should be concentrated within small areas between spatially narrow parts of the photonic device comprising said optical component.

It is also conceivable to combine several grating arrays according to the present invention on the same side of an optical waveguide. The grating arrays may be defined by different parameters like various slant angles or/and may cover different wavelength windows in case the grating arrays are designed with non-uniform periods like chirped Bragg gratings. It is also possible to combine grating arrays of different kinds like the one shown in FIG. 1a to d. In general, it may be of advantage in terms of cost saving to structure the grating arrays in the same layer i.e. the core layer as the one used for the optical waveguide to which it will be positioned.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An optical component comprising an optical waveguide structured in a core layer wherein at least at one side of a section of said optical waveguide a grating array is structured adjacent to said sections, said grating array being adapted to reflect stray light away from said optical waveguide, wherein said grating array consists of a multitude of polygons.

2. The optical component of claim 1, wherein said multitude of polygons are randomly laid out.

3. An optical component comprising an optical waveguide structured in a core layer wherein at least at one side of a section of said optical waveguide a grating array is structured adjacent to said section, said grating array being adapted to reflect stray light away from said optical waveguide, wherein said grating array consists of several adjacent stripes.

4. The optical component of claim 3, wherein at least a few of said adjacent stripes are equidistant from each other.

5. The optical component of claim 4, wherein said grating array of stripes is defined by at least two characteristic spacings for the equidistant stripes.

6. The optical component of claim 3, wherein the stripes are bent to optimize the reflection of stray light.

7. The optical component of claim 3, wherein a further layer is present on top of the cladding layer covering at least partly said optical component, said further layer layer inducing stress in the core layer at least partly converting the polarization of the stray light.

8. An optical component comprising an optical waveguide structured in a core layer wherein at least at one side of a section of said optical waveguide a grating array is structured adjacent to said section, said grating array being adapted to reflect stray light away from said optical waveguide, wherein said grating array consists of a Bragg grating adapted to reflect the stray light away from said optical waveguide wherein said Bragg grating is a chirped one with a non-uniform period adapted to a predefined window.

9. The optical component of claim 8, wherein said Bragg grating is slanted with an angle defined in the plane comprising said optical waveguide.

10. The optical component of claim 8, wherein said Bragg grating is slanted with an angle defined in a plane perpendicular to the plane comprising said optical waveguide.

11. The optical component of claim 10, wherein at least two different Bragg gratings are positioned on the same side, the gratings showing different periods and possibly different angles.

12. The optical component of claim 8, wherein said Bragg grating shows a focusing property to focus stray light away from said optical waveguide.

13. The optical component of claim 8, further comprising an optical absorbing material toward which the stray light is to be reflected by said grating array.

14. A photonic device comprising at least an optical component according to claim 8.

15. The optical component of claim 1, wherein a further layer is present on top of the cladding layer covering at least partly said optical component, said further layer layer inducing stress in the core layer at least partly converting the polarization of the stray light.

16. The optical component of claim 1, further comprising an optical absorbing material toward which the stray light is to be reflected by said grating array.

17. A photonic device comprising at least an optical component according to claim 1.

18. The optical component of claim 3, further comprising an optical absorbing material toward which the stray light is to be reflected by said grating array.

19. A photonic device comprising at least an optical component according to claim 3.

* * * * *